Aug. 4, 1959     D. E. KASTNER     2,897,569

CLAMPS

Filed Dec. 8, 1958

INVENTOR.

BY Donald E. Kastner

United States Patent Office 2,897,569
Patented Aug. 4, 1959

2,897,569

CLAMPS

Donald E. Kastner, Kenosha, Wis., assignor to
L. C. Thomsen & Sons, Inc., Kenosha, Wis.

Application December 8, 1958, Serial No. 778,853

2 Claims. (Cl. 24—279)

This invention relates to improvements in a clamp and has particular reference to a coupling or fastening by which a pair of generally tubular members may be joined together. In the form illustrated herewith it is particularly adapted for joining tubular members used in sanitary piping systems.

It is a general object of the present invention to provide an improved clamp comprising a band wherein the end portions are bent upwardly to provide oppositely directed ears, one provided to mount the headed end of a draw bolt and the other to mount a barrel-like enclosure to receive and enclose the threaded end of said bolt, said barrel-like enclosure having a thumb screw integral therewith and forming the end extension thereof.

In accordance with the foregoing objects and with other objects apparent hereinafter, a preferred species of the instant invention will now be described with reference to the accompanying drawing wherein.

Figure 1:
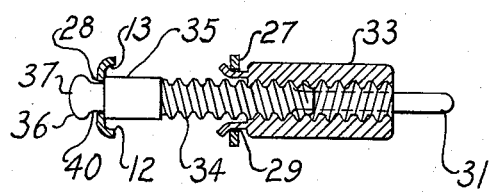
Figure 1 is a fragmentary view showing the screw in engagement with its associated parts.
Figure 3:
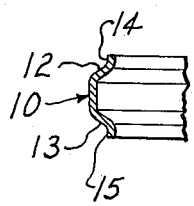
Figure 3 is a sectional view showing the cross-sectional conformation of the band.

Referring more particularly to the drawing, the improved clamp 9 includes a clamping band 10 manufactured of stock which is channel-shaped in transverse cross-section. The band has a flat central wall portion 11, a pair of divergent wall portions or flanges 12 and 13, and a pair of laterally directed edge flanges 14 and 15 connected to the wall portions 12 and 13, respectively, said flanges being substantially parallel with the central wall portion 11.

The central wall portion 11 is not provided with the wall portions 12 and 13 and is comparatively flat crosswise thereto and arranged whereby such portion 11 is free to flex and serve somewhat as a hinge.

The end portions 23 and 24 of the band are bent upwardly at an angle from the body of said band to provide parallel extending ears 25 and 26, one of said ears 25, being a continuation of the wall portions 12 and 13. The other ear 26 is flattened to provide a straight back surface 27 without the wall portions 12 and 13.

The ear 25 has a comparatively rectangularly-shaped opening 28 while the ear 26 has an enlarged circular opening or aperture 29.

A thumb screw assembly 30 includes a finger grip 31 which is mounted on ear 26 by passing one end of 31 through the opening 29 and then upsetting the end of 31 passing through the opening 29 to provide a collar 32 of greater diameter than the opening 28. Said thumb screw includes a barrel-like body 33 which is internally threaded to accommodate the threaded end of a draw bolt 34. The shank 35 of said bolt is reduced at the end 40 and pushed through the opening 28 with the end 36 upset to make a head 37. There is sufficient clearance between the reduced portion 40 and the opening 28 to provide movement up and down of the bolt as it draws the ears 25 and 26 together.

There is no exposure of the threads of the screw beyond the ear 26 because the threaded end of the bolt is contained in the barrel.

The recess provides mounting for the ear 25 and holds the ear therein. Forward or rearward movement of the bolt in the barrel draws together the ends of the band or separates the ends.

The improved band clamp provides a structure in the field wherein a draw bolt is used which has the usual sharp end and threaded portion of the bolt enclosed which in prior installations has caused much damage to the body and clothing of persons in the vicinity of a clamp and bolt installation. In the prior kind of clamps there was much opportunity to snag clothing and also cause injury to persons working with and about such installations. With the invention of the present structures, these hazards have been eliminated.

Figure 4:
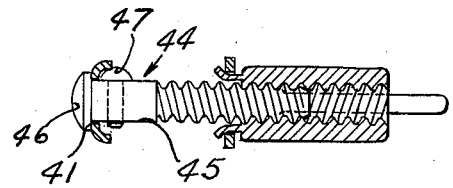
Figure 4 is a modified fragmentary view of structure similar to that shown in Figure 1.
Figure 2:
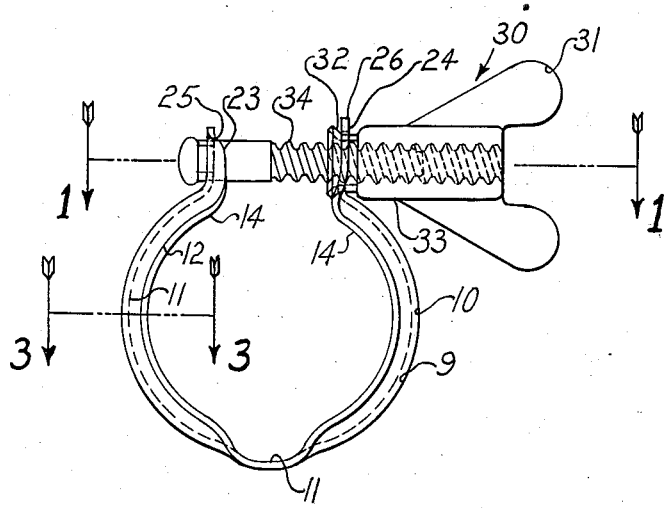
Figure 2 is a face view of the clamp.

Attention is directed to Figure 4. The structure shown in Figure 4 is similar to that in Figure 1 with the only difference in aperture 41 which is comparatively circular in shape instead of the rectangular opening 28 as in Figure 1 and 2, and with the shank 45 of draw bolt 44 of the same diameter on each side of the opening. Here again the end of the shank is headed at 46. The shank 45 can freely pass through the aperture 41 but is held by mounting the pin 47 in the shank.

Various changes and modifications may be made without departing from the spirit of the invention and all such changes are contemplated, as may come within the scope of the claims.

What I claim is:

1. The combination in a clamp comprising a clamping band having a circular extent of stock which is channel-shaped in transverse section and has inwardly directed side walls and juxtapositioned ends, each end bent upwardly at an angle from the body of said band to provide parallel extending ears, one of said ears being a continuation of said walls, the other ear being of a continuation of said walls which has been flattened to provide a straight back surface, said first mentioned ear provided with a rectangularly shaped opening, while the other ear is provided with an enlarged circular opening, a thumb screw assembly, said assembly including a finger grip and a reduced forward portion mounted on said second ear, said forward portion including a barrel-like body being internally threaded, a draw bolt, one end of said bolt mounted in said first ear with the threaded end, movable in said barrel body which encloses the threaded end of said bolt.

2. The combination in claim 1 with the addition of— the unthreaded end of said bolt pushed through said rectangular opening and upset at its end to provide a headed section larger than said opening to prevent said bolt from slipping through said opening, the diameter of said bolt being less than said opening whereby said bolt may move up and down and sideways in said opening.

References Cited in the file of this patent
UNITED STATES PATENTS

| 1,419,897 | Palmer | June 13, 1922 |
| 1,477,071 | Morgan | Dec. 11, 1923 |
| 2,042,263 | La Valley | May 26, 1936 |